US006351813B1

(12) United States Patent
Mooney et al.

(10) Patent No.: US 6,351,813 B1
(45) Date of Patent: Feb. 26, 2002

(54) ACCESS CONTROL/CRYPTO SYSTEM

(75) Inventors: David M. Mooney, Eden Prairie; Paul J. Kimlinger, Maplewood; James Virgil Bradley, Plymouth, all of MN (US)

(73) Assignee: Digital Privacy, Inc., Minneapolis, MN (US)

( * ) Notice: Subject to any disclaimer, the term of this patent is extended or adjusted under 35 U.S.C. 154(b) by 0 days.

(21) Appl. No.: 09/117,898

(22) Filed: Aug. 7, 1998

Related U.S. Application Data
(60) Provisional application No. 60/011,423, filed on Feb. 9, 1996, and provisional application No. 60/011,635, filed on Feb. 14, 1996.

(51) Int. Cl.[7] .................................................. H04L 9/00
(52) U.S. Cl. ...................... 713/185; 713/171; 713/172; 713/185; 713/200; 380/259; 380/260; 380/278; 380/283
(58) Field of Search ................................ 713/165, 166, 713/171, 192, 152, 164, 172, 183, 185; 380/259, 260, 269, 283, 278

(56) References Cited

U.S. PATENT DOCUMENTS

| 5,191,611 A | * | 3/1993 | Lang ........................... 380/25 |
| 5,327,497 A | * | 7/1994 | Mooney et al. ............... 380/25 |
| 5,479,512 A | * | 12/1995 | Weiss .......................... 380/28 |

FOREIGN PATENT DOCUMENTS

| EP | 0191162 A2 | * | 8/1986 | ........... G06F/12/14 |
| WO | 93/06542 | * | 4/1993 | ............. G06F/1/00 |
| WO | 95/24696 | * | 9/1995 | |
| WO | 97/29416 | * | 8/1997 | ............. G06F/1/00 |

OTHER PUBLICATIONS

"The Smart Card: A high security tool in EDP" (R.C. Ferreira, Sep. 1989, Philips TDS Review, all).*

* cited by examiner

*Primary Examiner*—Phung M. Chung
*Assistant Examiner*—Paul E. Callahan
(74) *Attorney, Agent, or Firm*—Fredrikson & Byron, P.A.

(57) ABSTRACT

An access control/crypto system having a smart card reader and an access control program for requesting information from a user to determine if the user is authorized to access the computer. The access control/crypto system uses encryption and smart card technology as a means for securing files stored on the system, telecommunicated globally, or archived to a chosen media. The system includes an access hierarchy, combined with the issuance of smart cards, to control the various levels of access provided by the system. Further, the present system provides secure file transfer by encrypting sensitive files at a first site, transferring the encrypted version to a second site, providing an authorized user at the second site with a secret password, and decrypting the file at the second site using the secret password under control of the authorized user.

17 Claims, 12 Drawing Sheets

SECURITY HIERACHIES

- LEVEL 0: CARD PIN
  - LEVEL 1: ACCESS CODE 1
    - *LEVEL 1 DATA*
    - LEVEL 2: ACCESS CODE
      - *LEVEL 2 DATA*
      - LEVEL 3: ACCESS CODE
        - ... LEVEL 3-5 ...

FIG. 9

ACCESS CONTROL/CRYPTO SYSTEM

According to 35 U.S.C. Section 119(e), this application claims the priority of U.S. Provisional Patent Application Serial No. 60/011,423, filed Feb. 9, 1996 and U.S. Provisional Patent Application Ser. No. 60/011,635 filed Feb. 14, 1996.

FIELD OF THE INVENTION

The present invention relates generally to a trusted security system and in particular to a system for protecting and controlling access to data using a system of electronic keys and a memory device.

BACKGROUND OF THE INVENTION

There is an increasing number of computers in use in business today. These computers have a large amount of propriety information which must be protected from unauthorized access. Additionally, secure transfer of sensitive information is a concern, since many forms of data transfer are susceptible to intrusion by computer hackers and other unauthorized persons.

Data often has varying levels of security and associated with those security levels are the various classes of persons who are authorized to access that data. A single password, therefore, is ineffective at adequately protecting sensitive data.

One system for preboot protection for a data security system is provided by PCT application WO 95/24696, by Mooney et al., which provides a secure computer controlling access to data storage devices via a card reader. Another system relates to protection of material on storage media and for transferring material on storage media to various recipients according to U.S. Pat. No. 5,191,611 to Gerald S. Lang. Yet another system relates to a method and apparatus for the integrated compression and encryption (concryption) of data according to U.S. Pat. No. 5,479,512 to Kenneth P. Weiss. However, none of these systems provides an access control/crypto system including communications means for conducting appropriate communications between a number of smart card readers and smart cards.

Therefore, there is a need in the art for an access control/crypto system which has redundant security features and having restricted access to a single user per access smart card. There is also a need for an access control/crypto system which protects information regardless of the means by which the information is transferred from the source to the destination. The system should provide secure information transfer over common communications carriers, such as the Internet and world wide web. The system must also provide for controlled, secure decryption at the destination by only authorized users. There is also a need for a sophisticated access hierarchy for such a system to accord varying levels of security to various classes of users.

SUMMARY OF THE INVENTION

An access control/crypto system having a smart card reader and an access control program for requesting information from a user to determine if the user is authorized to access the computer. The access control/crypto system uses encryption and smart card technology as a means for securing files stored on the system, telecommunicated globally or archived to a chosen media. The system includes an access hierarchy, combined with the issuance of smart cards, to control the various levels of access provided by the system.

An alternate embodiment of the present system provides secure file transfer by encrypting sensitive files at a first site, transferring the encrypted version to a second site, providing an authorized user at the second site with a secret password, and decrypting the file at the second site using the secret password under control of the authorized user. This embodiment provides secure transfer of information regardless of the transfer means used. In addition, the access hierarchy may be incorporated into this embodiment to provide varying levels of security for both the transmitter of information and the receiver of the information.

In one embodiment, the systems at both the first site and the second site are programmable to perform encryption or decryption, providing a secure bidirectional file transfer system which may optionally use any mode of communication available without risking loss or decryption of sensitive information. In an alternate embodiment, a compression feature is incorporated prior to file encryption to compress the data file, so that the encrypted version of the file is transferred more easily to the second site. The received file is decrypted and decompressed to provide the original file, provided the user at the second site has the appropriate secret password and the requisite access to the system via the smart card and card reader means.

Other embodiments are described which feature automatic file handling, so that unencrypted files are removed and erased from the system during the encryption process to ensure that the sensitive information is not accidentally left on the system and vulnerable to unauthorized persons. After encryption, the encrypted files are accorded special extensions to identify the file as the encrypted version of the original file, and the original file is overwritten to render the original file unrecoverable. This means that the user must have the appropriate key to decrypt the encrypted file and ensures security of the sensitive information. Another aspect of the present system is an access control/crypto system including communication means for providing proper communications with a number of smart card readers and smart cards. This aspect allows the system to automatically select appropriate communications for a particular of smart card reader and smart card. Further embodiments are discussed, however, these are intended to illustrate the present system and not intended in a limiting or exclusive sense.

BRIEF DESCRIPTION OF THE DRAWINGS

In the drawings, where like numerals describe like components throughout the several views:

FIG. 9 is a block diagram showing various security levels and hierarchy;

DETAILED DESCRIPTION OF THE PREFERRED EMBODIMENTS

In the following detailed description of the preferred embodiment, references are made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the present invention. The following detailed description is, therefore, not to be taken in a limiting sense, and the present invention is recited by the appended claims and equivalents thereof.

The present system is an access control/crypto system which may be practiced in a variety of embodiments, including, but not limited to, data access security, computer trusted security, telecommunications security, and archival security. For purposes of illustration, the invention is described here in the context of a computer security application. Several other embodiments, however, are possible without departing from the present invention.

The computer security application is a file encryption/decryption system. It restricts access to, and ensures trusted security of confidential, proprietary, classified, or other sensitive information contained in files in the computer system. After the system encrypts the files (makes the files unreadable to those without the required decryption key), the files may be securely: (1) stored on the computer system without compromising the data, even if the computer is stolen (e.g., stored on a hard drive of a portable, laptop, or desktop computer); (2) communicated to another computer via point to point network, E-mail, Internet, World Wide Web, or other electronic communication method; or (3) archived to any media. The encrypted files can only be decrypted using the electronic key contained on the unique, personalized, ITAI prepared smart card. The electronic key provides a means of duplicating and transporting files to other users without compromising data security.

Walk-through by Explanation

Figure 1:
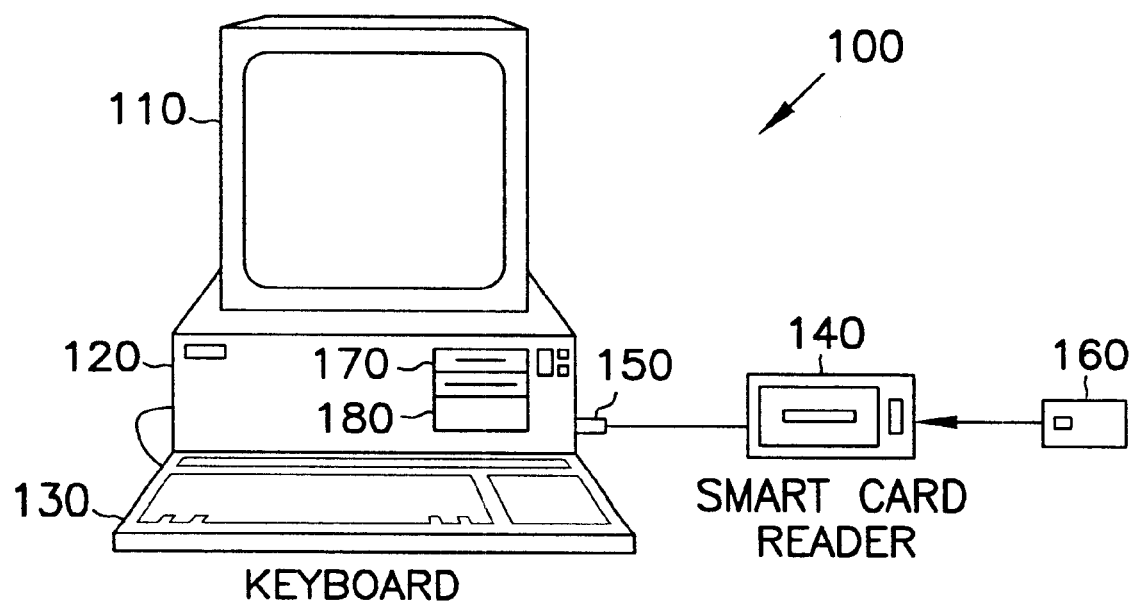
FIG. 1 is a block diagram of one environment in which the present system may be used.

FIG. 1 shows a personal computer system 100, which is one environment in which the present invention may be practiced. The computer system 100 has a monitor 110, chassis 120, hard drive 180, floppy drive 170, input/output port 150, keyboard 130 and smart card reader 140. Also included is a smart card 160 which contains access information and application specific information. In one embodiment, input/output port 150 is an RS-232 port. In an alternate embodiment, port 150 is a PCMCIA port. Other types of input/output ports are possible without departing from the present invention, and the examples given herein are intended to be demonstrative and not exclusive or limiting.

In one embodiment, computer 100 executes a special security program which encrypts and decrypts files stored on hard drive 180, floppy disk in drive 170, or other electronic storage devices. A special key generation function is executed to provide unique encryption keys based on a pseudo-random key generator prior to encrypting or decrypting files. These keys are stored on the smart card 160 and retrieved by the application during the file encryption/decryption process. To access the smart card 160 however, the user must enter the correct set of passwords into the system.

During the encryption/decryption process, the user may select options (1) to compress the documents, and/or (2) to include a digital signature which provides logical proof of who encrypted the document and that the document has not been tampered with.

Figure 2:
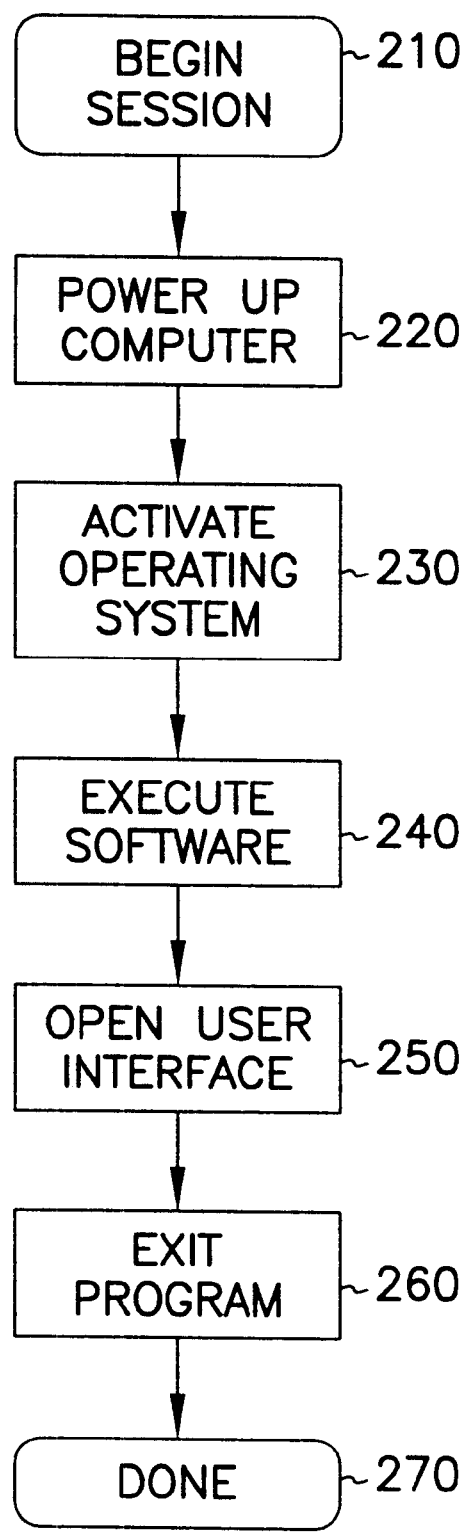
FIG. 2 is a flow diagram showing one embodiment of a user session.

An overview of a typical user session is shown in the flow diagram of FIG. 2. Prior to the start of the user session the software is loaded onto computer 100 in a manner well-known to those skilled in the art. A user session is begun by powering up computer 100 (step 220) and activating an operating system program (step 230) to manage the resources of computer 100. One example of such an operating system is Microsoft's Windows®. Other operating system programs may be used without exceeding the present invention. The software is then executed (step 240) by the user. In a Windows® environment this step is performed by clicking on an icon representing the software, where in a DOS environment this step is performed by keying in the appropriate text string. Other operating systems may execute the program in manners known to those skilled in the art without departing from the present invention.

In one embodiment, the software provides a series of windows (step 250) to assist the user in creating an encrypted file from an unencrypted file or, alternatively, decrypting an encrypted file. The software also offers a variety of batch processing options and provides several different algorithms to use when performing the encryption or decryption steps. The user exits the program (step 260) when they have completed processing files. According to one embodiment, when the user exits the program the program terminates, while in another embodiment the program is left to operate in the background of the computer system for future encryption and decryption purposes.

Figure 3A:
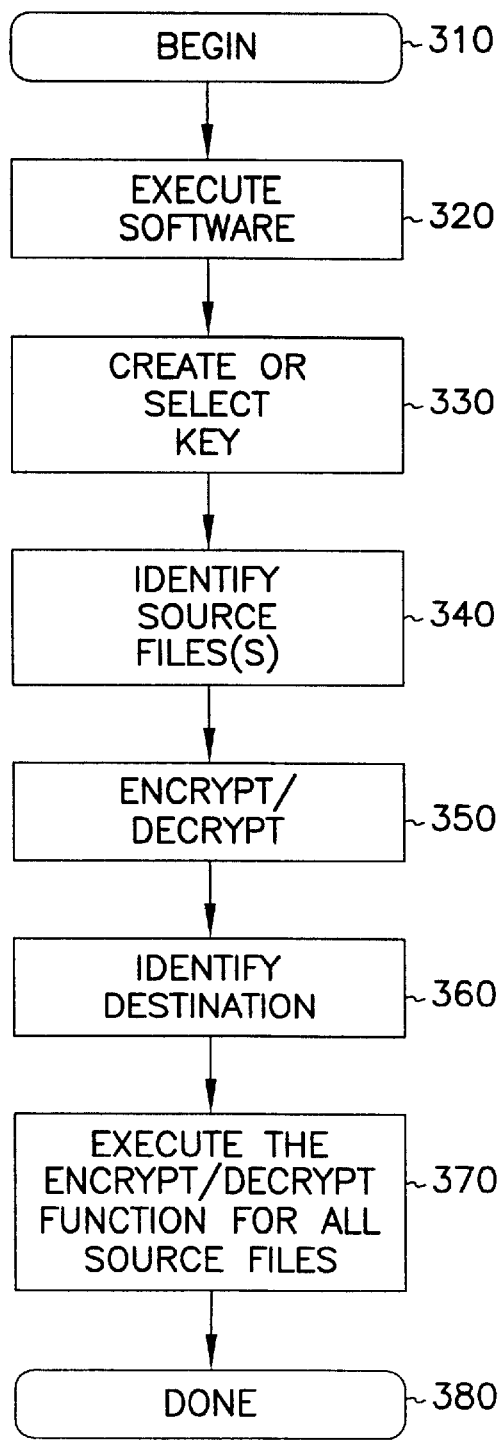
FIG. 3A is a flow diagram showing a session according to one embodiment of the present invention.

The software program execution logic flow of one embodiment of the present invention is shown in FIG. 3A. The user begins by executing the software (step 320). The user is then given the option of creating a new key for encryption/decryption 330 or selecting a previously created key from the smart card. In one embodiment, the user is next asked to identify:

a source file or a set of source files (step 340).

whether to encrypt or decrypt those source files (step 350).

the destination file and directory information (step 360).

functions for the identified file or files (this step is optional and is not shown in the figure). These functions include but are not limited to data compression and digital signatures.

The encrypt and decrypt functions may then be carried out on the source file(s) as indicated in step 370. After the selected encrypt or decrypt functions are performed, the user may either go back to the beginning and create a new key or select an existing key, or terminate the software program.

Figure 3B:
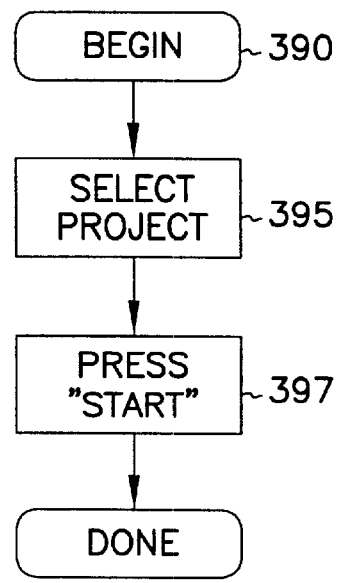
FIG. 3B is an alternate option of the session shown in FIG. 3A.

In one embodiment, a short-cut is provided by recording the steps shown in FIG. 3B and storing them in a file referred to as a project file.

Walk-through with Window Interface Diagrams

One embodiment of the present software is demonstrated by the screens shown in FIGS. 4 through 7. In this example, a user encrypts a series of files with a new key by performing the following set of keystrokes and mouse actions.

Prior to a user receiving the system, a smart card preparation program is run by ITAI to (1) initialize the smart card access codes, (2) create necessary smart card files including session key files, level files and data files, (3) initialize those files with level key data, default questions, and the session key as described below it the "Access Control Code Mechanism" section, and (4) initialize the smart card database (SCDB) described below in the "Smart Card Database" section. Upon receiving the system, the user changes the default questions and answers to something only that person can answer.

Figure 4:
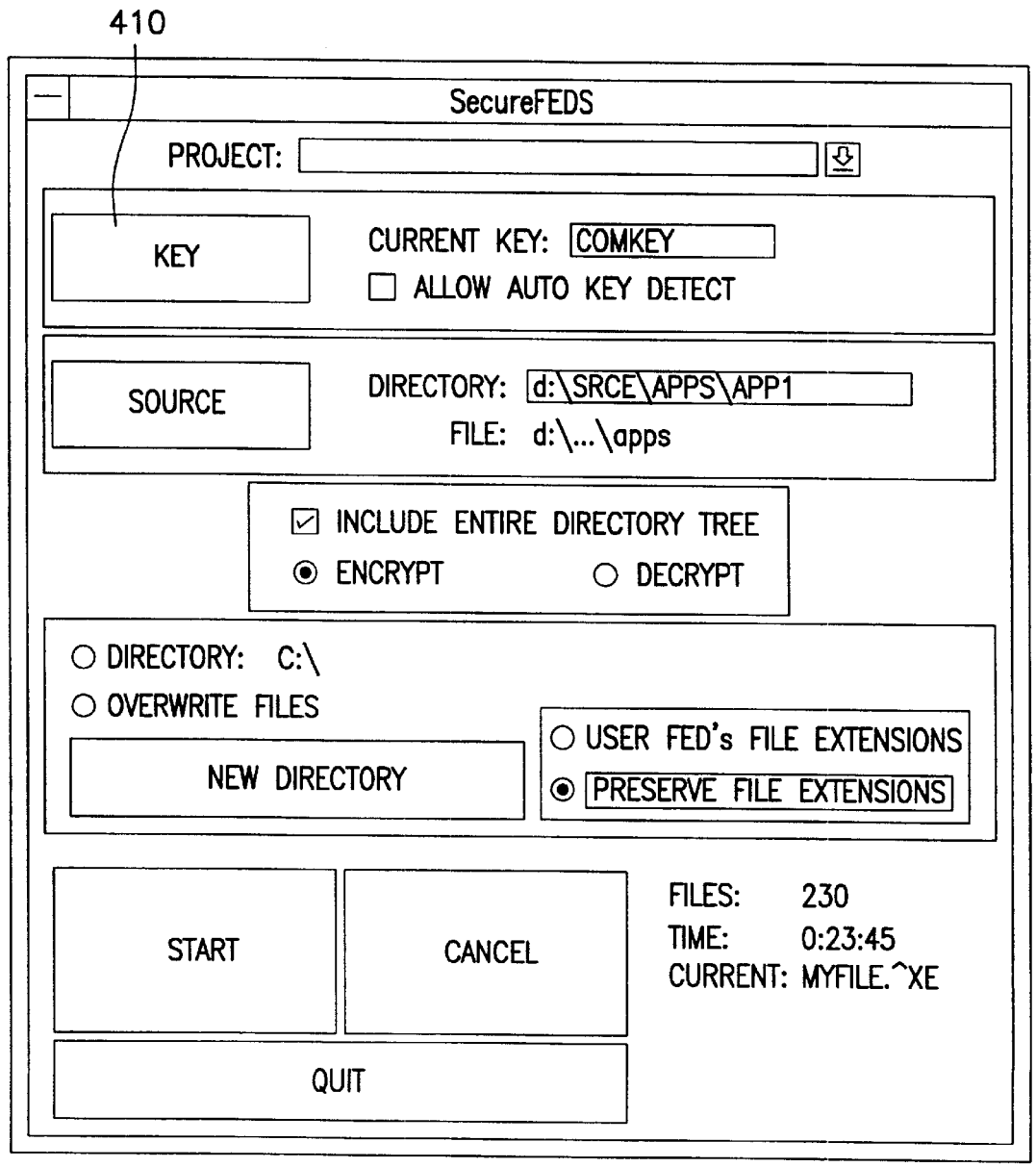
FIG. 4 is a snapshot of a Main Screen.

Upon execution of the software of one embodiment of the present invention, the main screen shown in FIG. 4 would appear. A user presses the key button 410 and obtains the key search and selection window shown in FIG. 5. In this example, the user is creating a key named "comkey" 510 and it is located in a smart card which is inserted into the smart card reader on COM port 1 520.

Each key is assigned a security level 530 which is a measure of the number of hierarchical steps required to be completed before the user can have access to the key. As described in more detail below, a key may have certain attributes associated with it. The user can select from a variety of attributes 540, including but not limited to key expiration dates. In one embodiment, the user may choose from several types of keys suitable for various public and private key encryption/decryption algorithms including (but not limited to) RSA, Elliptic Curve, DES, RC5, RC4, and RC2.

After entering all of the appropriate information, the "make new key" button 550 is pressed and an encryption key (such as a DES key) is generated by the software. But, before the smart card can be accessed for storing this key (as well as for retrieving it later), a series of questions must be answered correctly by the user. The questions and answers were preprogrammed by the card's owner and known only by him or her. One can therefore presume that only a user authorized by the card's owner has access to the keys (and other smart card information). After the "make new key" button 560 is pressed, the password screen shown in FIG. 6 appears and a series of questions 610 is presented to the user which must be answered before access is granted to the requested security compartment. The number of questions asked depends upon the security level selected by the user. The user is asked one question 610 for each level up to and including the level selected 620. For example, if the user selected level 2, they would be asked to correctly answer two questions. At each level there are multiple questions, one of which is randomly selected by the software to be presented for that level 620.

In one embodiment, after the user enters three incorrect answers, that security level and all levels under that security level are locked out to prevent further access by the user. Those skilled in the art will recognize that the number of incorrect answers triggering a lock-out may be adjusted to comply with a given site's security policy without departing from the present invention.

Figure 5:
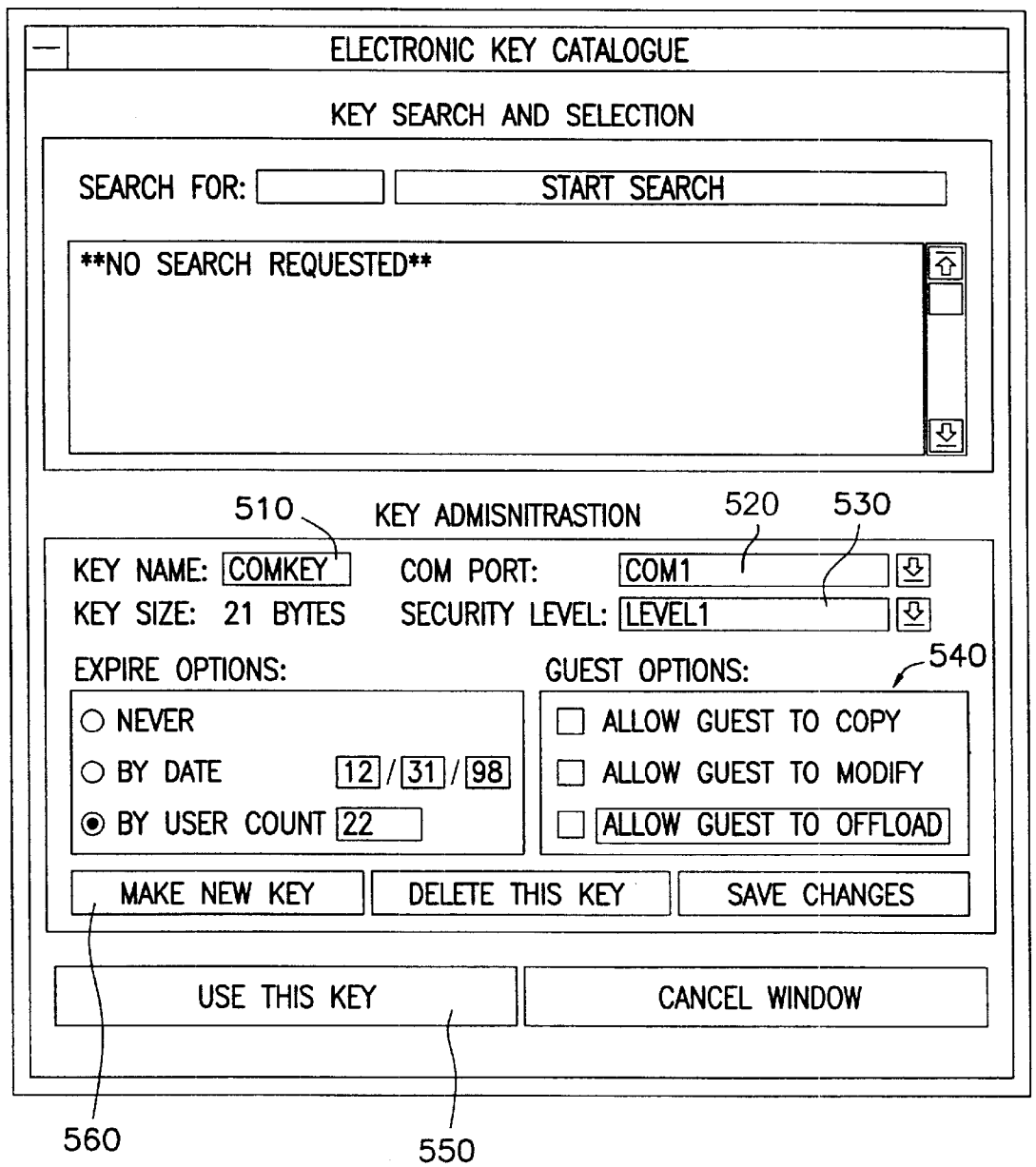
FIG. 5 is a snapshot of an Electronic Key Screen.
Figure 6:
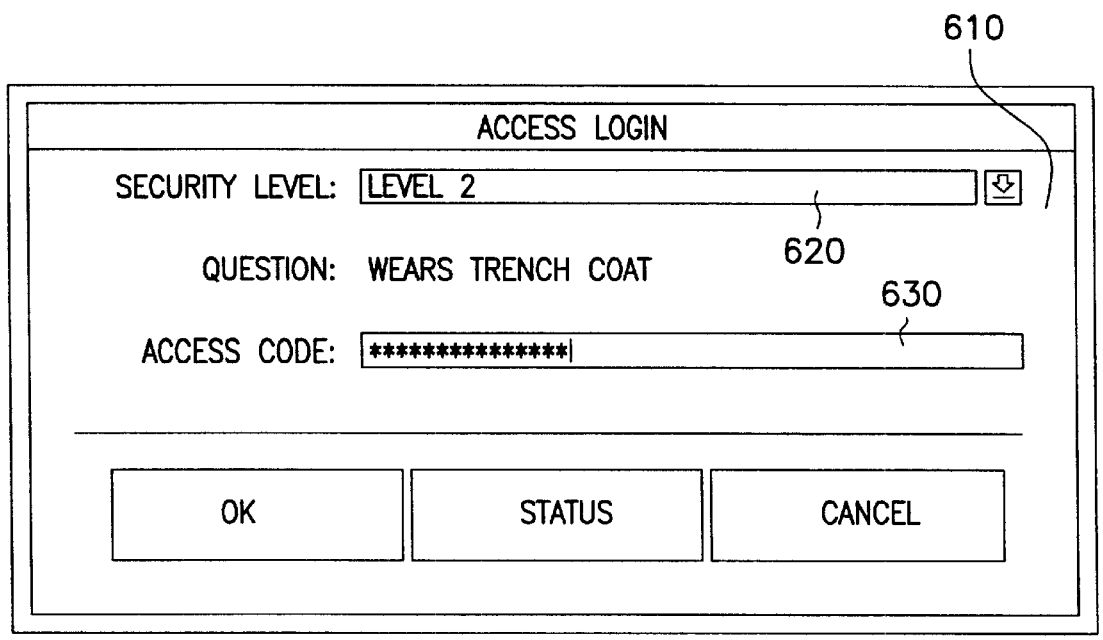
FIG. 6 is a snapshot of a Password Screen.

In the embodiment shown, after the proper number of correct answers have been successfully entered, control is returned to the screen shown in FIG. 5. The user then presses the "Use This Key" button 550. All key information is passed back to the main control module window (FIG. 4) except the actual key itself. The actual key is retrieved via a separate electronic key module interface when the key is committed to be used—this prevents the key from being unintentionally expired in the event the user decides to select a different key after exiting the "Electronic Key Catalogue" screen shown in FIG. 5.

Figure 7:
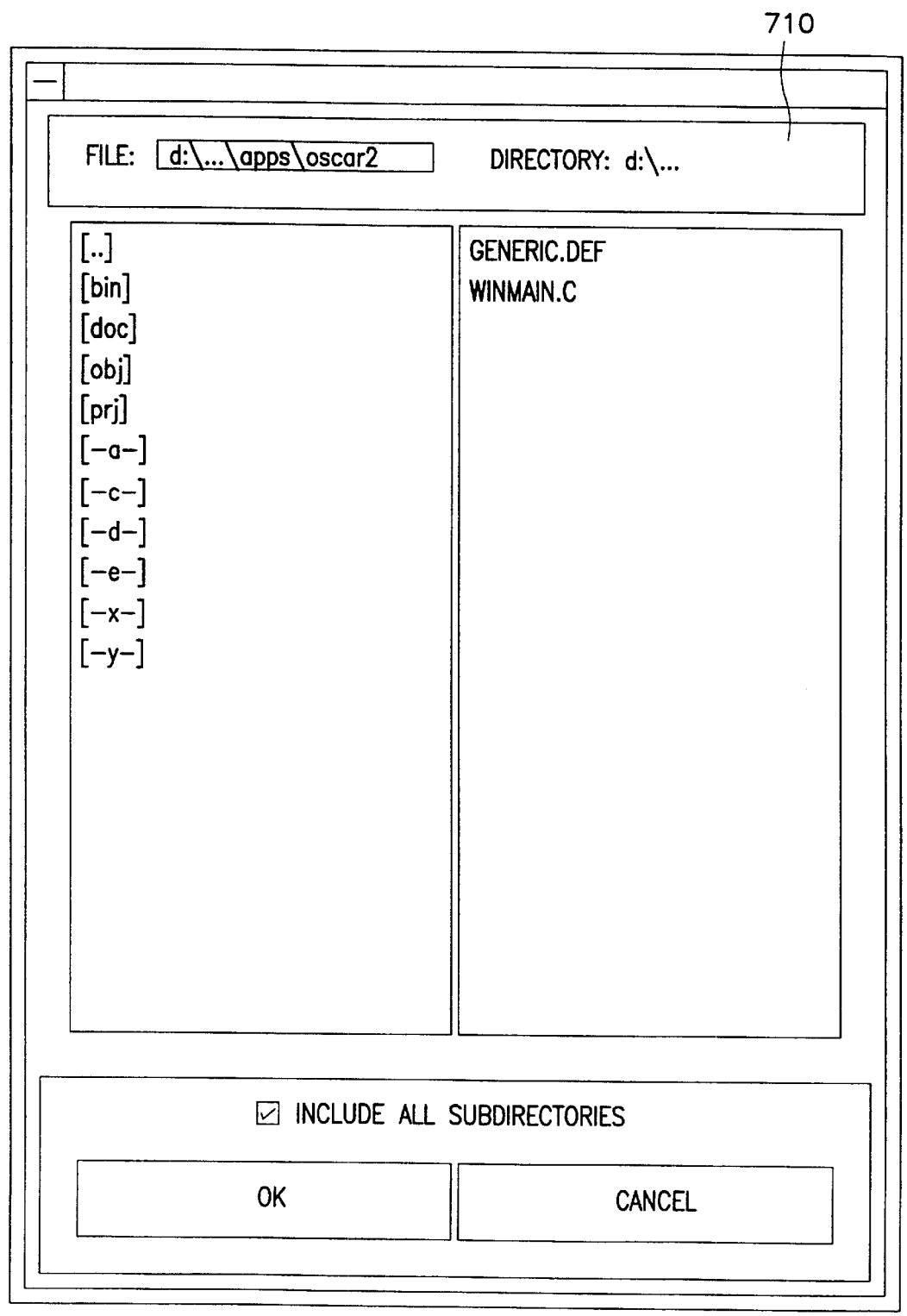
FIG. 7 is a snapshot of a File Selection Screen.

After selecting an electronic key, the user must identify a file or set of files. One example of a file selection means by which source files may be identified is shown in FIG. 7. Other file selection mechanisms may be implemented without departing from the scope of the invention. The selection mechanism must simply be able return a list of files (for example in a "linked list") to the caller of the function.

The software also provides user-selectable processing options which affect the original file(s) and new encrypted file(s) during encryption/decryption. These options include: (1) overwriting the original file(s) with the encrypted data; (2) overwriting the original file(s) with random data and then deleting the original file(s); (3) deleting the original file(s), leaving an image which can be "un-deleted"; or (4) leaving the original file(s) unmodified. The encryption file(s) can: (1) overwrite the original file(s); (2) be placed in a directory tree which mirrors the source tree; or (3) be placed in a single directory. The new file names may: (1) retain their original names; (2) be modified such that a single character is replaced by a '^' (i.e., "patent.doc" would be modified to "patent.^oc"); or (3) be renamed to a number, thereby masking the original name. The newly encrypted file(s) contain information to indicate the original directory path and filename along with information returned from the common "stat" system call.

In one embodiment, when an encryption takes place, the default operation is that the program attaches the special extension to the encrypted file and destroys the original, plain-text data file to preserve security of the contents of the original data file. Once the key, source file, and destination file options have been chosen, the user may push the "start" button to begin the encryption/decryption process.

Figure 11:
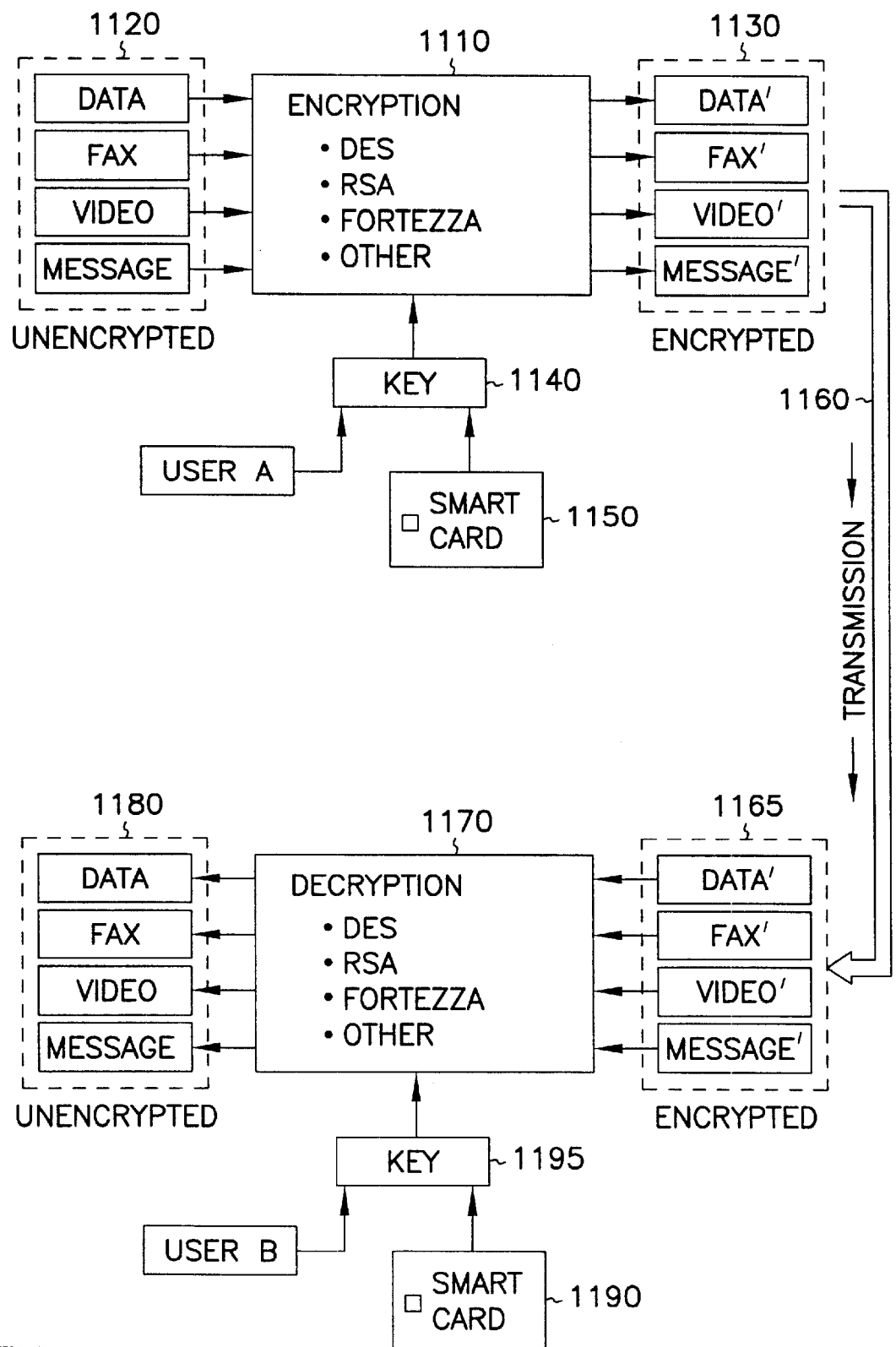
FIG. 11 is a block diagram showing one embodiment of the present invention.

As stated before, in one embodiment, the system is used to secure files stored on a computer system. In an alternate embodiment, the system provides secure transportation of files, as illustrated in FIG. 11. In FIG. 11, the system 1110 converts unencrypted source files 1120 into encrypted files 1130 using a key 1140 generated by inputs from a user A and a smart card 1150. As shown in FIG. 11, the converted files 1120 may be data, facsimile, video, or other messages, such as e-mail. The encrypted versions 1130 are denoted as data', facsimile', video', and message', respectively. The encrypted files 1130 may be transported using any transmission means 1160, including but not limited to a modem link, the Internet, the World Wide Web, U.S. Mail, or courier (e.g., fixed in removable media such as a floppy disk). The files are received at a remote site in their same encrypted form 1165 and decrypted by system 1170 using key 1195, which is identical to key 1140. Key 1195 is created by, and obtained from, User A who also has a smart card 1190 for access to system 1170.

FIG. 11 shows only one direction of data conversion and flow. In practice, however, systems 1170 and 1110 may be bi-directional in nature and therefore provide a bidirectional, secure data transfer means.

Principal Components and Processes
ITAI Internal Card Preparation

This section describes smart card preparation. The purpose of smart card preparation is to format the smart card and incorporate the initial smart card access codes. An access code is a 'password' which is initially randomly generated by ITAI and then changed by the end user.

The access code protection scheme is a built-in feature of smart cards. The smart card operating system requires submission of the correct access code before granting access to the information contained within the smart card. The present invention supports several types of smart cards, each with its own formatting requirements and access code methodology.

User Personalization of Smart Card

Part of the user installation process includes the personalizing of the smart card. During personalization, the user changes the "card pin" as well as the questions and answers which are used to access the smart card.

When a user starts the application, he or she will be asked to key in a the "card pin". This will unlock the section of the smart card which contains the questions and answers which are required to unlock the first security compartment. When that compartment is unlocked, information becomes available to access the questions and answers to the following security level. This process continues until the requested security level has been reached.

Personalization of the smart card includes the process of getting questions and answers from the user and writing them to the smart card in a secure format. Depending on the application, the user will be allowed, through maintenance functions, to change both the "card pin" and all questions and answers during future sessions.

Keys

What is an Electronic Key?

An electronic key is a piece of digital information used to control access to system resources such as data files, program modules, or peripheral devices. The digital information is formulated such that the key cannot be guessed or otherwise recreated without permission of the key owner. Access to any protected resource can then be controlled according to who has control of the electronic key. In one embodiment of the present invention, electronic keys are stored on the smart card in such a fashion that only the intended user is allowed access to these keys. Any attempt by unauthorized users to access the electronic keys on the smart card results in the logical destruction of these keys (thereby maintaining the integrity of the resource protected by the keys).

In one embodiment, the software allows a user to create, modify, store, access and delete a universal electronic key set using a smart card. These electronic keys are used to encrypt and decrypt electronic information including, but not limited to, E-mail, data files and data communications. In other embodiments and applications, electronic keys are used to restrict access to electronically controlled devices including, but not limited to, electronically controlled door locks and automobile ignition systems.

Creating Keys

Key administration, including key creation, is controlled by the Electronic Key Module. The module presents two interfaces for creating keys, a window (GUI) interface, and a program library interface.

The window interface presents the user with buttons, edit windows and other controls which allow for the collection of data from the user. The data collected includes all information required to construct the keys as previously described. This information includes, but is not limited to, the encryption algorithm for which the key will be used, the human readable name associated with the key, and the key attributes. The window controls themselves are not unlike those used on most personal computers. They may be designed using common software development tools. It is the responsibility of this module to: (1) perform all functions necessary to display and control the mouse, keyboard and screen for the given operating system environment; (2) retrieve information from the user pertaining to the electronic key being generated via keyboard and mouse; (3) organize user data in a format suitable for use by the Electronic Key Module's key creation functions; and (4) display status information.

The program library interface of the Electronic Key Module may be accessed from the window interface just described, or from an external application via the same function calls (using techniques common in the art). The program library takes the key information data and generates an encryption key. Depending on the type of key being created, the Electronic Key Module may use external cryptographic apparatus to do the actual key creation (such as those found in cryptography packages commonly available in the industry). In some embodiments, however, the Electronic Key Module may create the key using internal algorithms without departing from the scope of the present invention.

With the electronic key created, the module stores the key and the pertinent user information in the Smart Card Database (using the SCDB module). The resulting status of the database transaction is the embodiment of the caller being the window interface, the status information is displayed to the user using common text controls.

The present software is useful to protect data from theft. It utilizes features of the smart card to authenticate users while incorporating multiple levels of security. Once authenticated, the user is granted access to a database which stores objects such as electronic keys. One of the unique features of this invention is the fact that electronic keys to a variety of resources may be stored on the smart card. For example, a user may store an electronic key which accesses an electronically controlled-door lock on the same smart card which is used to store keys that control access to electronic mail. In the case of a door lock, the key provides the correct digital signature to activate the locking mechanism. In the case of file encryption, the key is the initial seed for an encryption engine such as DES. The actual device or mechanism controlled by these keys is not restricted by this invention.

According to one embodiment, information other than electronic keys is secured on the smart card. Access to the secured information is protected and controlled in the same fashion as described for protecting electronic keys.

In one embodiment, there are two types of keys, automatic keys and manual keys. Automatic keys are comprised of a random number generated by the application and manual keys are made up by the user. Manual keys are primarily used for exporting and importing automatic keys. Automatic keys are the keys which are used to do the actual data encryption.

In a preferred embodiment, a user instructs the present invention via a graphical user interface (GUI) to create keys and store them on the smart card. There are several pieces of information which get created and stored with each key, including a unique key ID, a human readable name given by the user, and several key attributes.

The key itself is actually generated by algorithms run on a computer or by external hardware encryption devices attached to the computer. The algorithms vary according to the encryption method which was chosen.

The key name is the English name the user wishes to associate with an actual key and is associated with the key at the time it is created. When the user does the data encryption the key is selected according to the associated English key name.

Key attributes are a means of providing security options to the user. They define such things as the life-span and security levels of the keys. For example, some keys may be one-time use keys where the key is destroyed after a single encryption. Listed below are options provided by one embodiment of the present invention:

Fixed Count Use Keys: A fixed count use attribute allows a key to be used only a specified number of times. Each time the key is referenced the count drops by one. Once the count reaches zero the key is deleted and can never be referenced again.

Duplicable Keys: Setting the attribute to allow duplication permits a "guest" (a guest is a user other than the key owner) to copy the key to other users. This attribute is used in cases where the guest is trusted, generally low security situations such as work groups sharing access to semi-critical information.

Expiry Date: This attribute destroys a key once a certain date is reached. This attribute assumes that the system date is secure, such that a guest cannot manipulate the system date and bypass this mechanism (this is not generally a safe assumption in the case of personal computers).

Fixed Flow: The Fixed Flow attribute controls the number of accesses granted to a particular user in a given time frame. This controls the number of times a user is granted access to an object or file. If the key was used, for example, to open a door, then the user could be limited to passing through the door n-times per day.

Group Keys: The Group Keys attribute provides classification of groups of users and sorts the classifications according to access level. In one embodiment, the system provides for a common key identification for more than one user. The common key provides access to sensitive files for all users contained in that group. Each user may also have other keys at varying levels of security, the number of keys limited only by the memory capacity of the smart card.

Ultra Secure: This feature provides a second password query, requiring the user to enter a second password or other biometric information. The additional information is used to generate the encryption key used to encrypt the file. This provides a second layer of security, since both keys are used to encrypt the file.

Auto Key Detection: Auto key detect provides convenience to the user. Rather than having to select the key to decrypt a file, the system automatically detects which key needs to be used, after the user has submitted the access code to the smart card. This slightly reduces the level of security, since this information will need to be semi-public information in the object you are trying to access.

Off-Load Permission: Lack of this attribute prevents a guest from off-loading this key from the smart card to an external storage medium such as a hard disk. If this permission is granted, then the user can free up space on the smart card by storing keys on a hard disk (with encryption protection of course) and reloading them to the smart card only when needed. Periodic Keys: Certain applications can modify keys with use. To make this work, a new key is created periodically and replaces the original key once it has been determined that all outstanding copies have been updated. Every owner-to-guest transaction would contain instructions to update the new key which would result in decrementing a reference count. When the count reaches zero, the original key is no longer needed and is removed from the smart card. Only certain types of application are able to make effective use of this feature. The characteristics of such an application include a low number of guests and/or a high transaction rate involving two-way correspondence between the owner and the individual guests.

Encryption Method: This attribute provides a means for indicating which one of various encryption algorithms is to be used for encryption and decryption. Some examples of possible encryption algorithms are DES, RSA, and FORTEZZA. Other encryption algorithms are possible, including proprietary encryption methods, without departing from the present invention.

Other Attributes: Other attribute types may be added without departing from the present invention.

In the embodiment shown, the electronic keys are stored on a smart card which is accessed via a smart card reader device connected to a personal computer. One skilled in the art will, however, readily recognize that any device that can read or write smart cards may be used to access the smart card instead of a personal computer.

Duplicating Keys

Once a key is created and stored on the smart card, it may be copied (at the discretion of the key owner) to a second smart card, or sent to a remote user who downloads that key onto his or her own smart card. This feature permits multiple smart cards to hold identical copies of the same key and thus access the same device or exchange encrypted files over an unsecured network in a secure manner.

Electronic keys may be copied to other users, referred to as "guests". The mechanisms to copy electronic keys to guests create an encrypted sequence of data that can be stored as a file on any common data storage device (such as floppy or hard disks) or transferred via electronic mail, modem, or any other medium used to transfer common data files. The user who created the key (the key owner) attaches attributes to the keys which are contained as part of the electronic key data. The key attributes provide means to: (1) expire keys, preventing them from further use based on (a) elapsed time measured in days, (b) number of uses and/or rate of usage per hour or day; (2) prevent or allow keys to be further duplicated by guests; (3) allow or disallow features for saving keys on-disk; (4) allow or disallow features to automatically detect which key to use during the decryption process; or (5) automatically change the keys over time (these are referred to as dynamic keys).

There are three ways for keys to be destroyed: The first way is via smart card destruction. Smart card destruction occurs when an unauthorized user exceeds the limit for invalid access code submissions. In this case, the smart card automatically and permanently locks up. Once the smart card is locked, there is no way for anyone to access the cards or the keys therein. Under certain smart card configurations, the user may have the ability to unlock the smart card providing the Administrator access code has not been locked. The administrator access code can be locked by three unsuccessful submissions of that code, or it may be deliberately locked out during smart card preparation.

The second way to destroy a key is via manual key deletion. Manual key deletion refers to the user activating the graphical user interface (GUI) providing window controls to select a key from a list of keys currently stored on the smart card, and selecting a button which initiates a function which removes the selected key from the smart card.

The final way for keys to be destroyed is by automatic key expiration. This occurs when one of the automatic destruction key attributes is selected during key creation or exportation. For example, a key can be configured to expire on a given day or after a certain number of uses. The key is then automatically invalidated and deleted when that date or predefined number of uses is reached.

Key Duplication/Key Sharing

In most cases, the users will want to share data with another remote user in a secure manner, requiring the sharing of keys. Generally speaking, the key owner creates a key and then makes a copy of that key for use by the remote user. The owner of the key is said to export the key while the guest is said to import the key. The system of the invention provides several means of accomplishing key duplication and transfer. In one embodiment, however, the system assumes that there is one key owner and that the key owner has created a key which is resident on his or her smart card.

One method of transfer is the direct key transfer method. This method works by having the owner insert his or her smart card into the smart card reader attached to the PC running the application and requesting a direct key transfer of a specified key. The selected key is extracted from the smart card and stored in the memory of the PC. The guest then inserts his or her smart card into the same machine, enters the security access code, and answers his or her questions. The key then gets copied from the PC's memory onto the guest's smart card.

The second method of transfer is the remote key transfer method. This method works by using manual keys. First the owner selects the remote key transfer option and selects a key. The key owner is then asked to enter a question and answer set which will be presented to the guest. The answer is converted into an encryption key which is used by an encryption algorithm to encrypt the real key to be exported. The key to be exported is then encrypted with this new key and the encrypted information is written to a file.

This file can then be transmitted via network, the Internet, the World Wide Web, or exported to diskette or other removable media and sent via U.S. Mail or courier, without compromising security. The remote user must acquire the manual key from the owner separately via telephone, fax, courier, etc. The guest then selects the import key option and is presented with the question which the owner supplied. The answer given by the guest is converted into an encryption key used to decrypt the exported key with algorithms similar to those used on the owner's side.

Regardless of the method of key transfer, once both users have shared a key, data can be encrypted and shared over any digital communication channels or left on a disk drive and still be secure.

Library Modules
Overview

Figure 8:
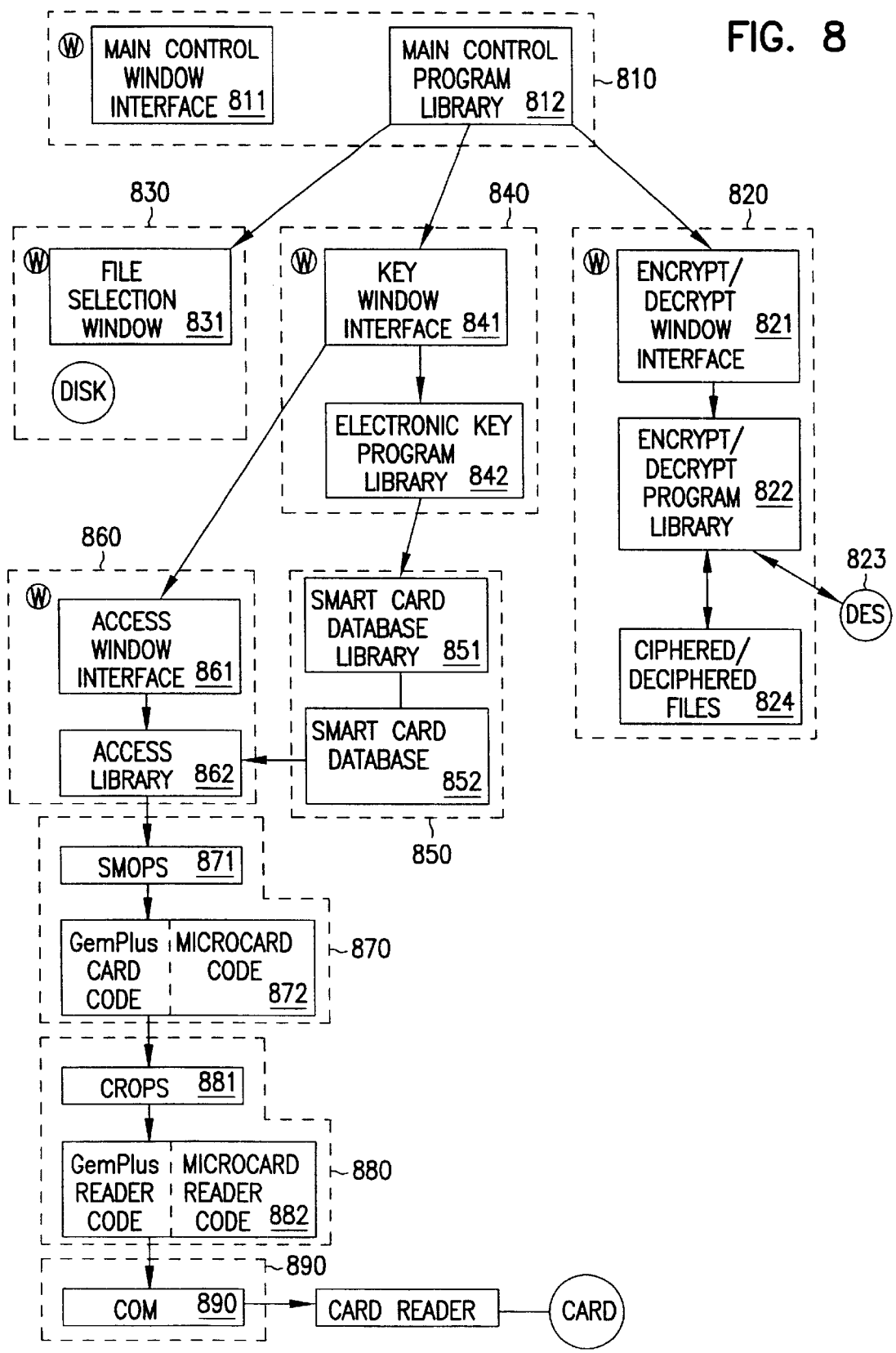
FIG. 8 is a block diagram showing the different levels of operation of one embodiment of a security access program.

The program contains the following interfaces or modules (shown in FIG. 8), which provide access to module layers:

(1) Main control 810
(2) File Encryption/Decryption 820
(3) File Selection 830
(4) Electronic Key 840
(5) Smart Card Data Base (SCDB) 850
(6) Smart Card Access 860
(7) Smart Card Operations (SMOPS) 870
(8) Card Reader Operations (CROPS) 880
(9) COM (device layer) 890

For the purposes of this document, 'interface', 'layer' and 'module' are used interchangeably. SMOPS 870, CROPS 880, and COM 890 are collectively referred to as the lower layers. The SMOP's interface 870 therefore may be referred to as the lower layers.

Each interface may be classified into one or a combination of the following interface types: a window interface, also referred to as the end-user interface, and a (program) library interface which is called by other programs or program libraries.

In one embodiment, the window interface utilizes the programming interfaces supplied by Borland Turbo C® and Borland Resource Workshop® to run on any version of Microsoft Windows®. One skilled in the art will recognize, however, that other interfaces or operating systems can be used without departing from the present invention. In the preferred embodiment, the program library interface is written in the computer language C and/or C++.

Module Descriptions
Main Control Module

The main control interface 810 provides a starting point for the program known in Windows programming as winmain. It is responsible for retrieving and dispatching messages from the operating system. The main control interface 810 is also responsible for collecting information from the other modules and sending that information to the File Encryption/Decryption Module 820 where it is used to control the processing of the files to be encrypted or decrypted.

The main control interface 810 is also responsible for the main window display. The main window display provides buttons, edit windows, check boxes, scroll bars, et cetera, collectively known as window controls, which are not unlike those found in other windows programs. The window controls in the main module 810 provide the user with access to the to the other window and program library interfaces.

File Encryption/Decryption Module

This interface 820 defines a library of function calls and data structures which take as input a defined set of source files, an electronic key, and a defined location for the resultant encrypted files. The library function 822 then encrypts the source files using DES 823, although other encryption algorithms may be used. For example, in alternate embodiments the system incorporates a commercial encryption algorithm, government encryption algorithms, or both. This provides an encryption which is compatible for either commercial or government uses, or can be configured to handle both. Various options are available based on arguments supplied to the interface, the original files may be overwritten or mirrored in a separate tree.

When mirrored files are used, the original files may, if requested, be overwritten to destroy the original data and then automatically deleted. To allow the key to be automatically selected during the decryption phase the files may include information to identify the key, but do not contain the key itself. This pertains to the auto-key-detect key attribute.

File Selection Module

This interface 831 defines structures and provides window controls for the user to browse file systems and define sets of files. This list of files is passed back to the main module 810 and ultimately used by the File Encryption/Decryption module 820.

Electronic Key Module

This interface 841 provides window controls to access the electronic key database 852 stored on the smart card. The program library 842 in turn accesses the smart card database interfaces 851. The purpose of this module 850 is to take user input via window controls to: (a) create keys, (b) modify keys, (c) delete keys, (d) define key attributes, and (e) browse the electronic key database. Any selected keys are passed back to the main module 810 and ultimately used by the File Encryption/Decryption module 820.

In one embodiment, the program library 842 is interfaced by the electronic key window interfaces 841. In alternate embodiments, however, other programs or modules directly access the electronic key program library 842.

Smart Card Database Module

This database module 850 provides a programming interface which allows the user to store a collection of objects called records into a database. A record in a block of information broken into one or more fields. A database makes it possible for the user to search for, add, delete and update information contained in one or more records.

The functionality of the Smart Card Database Module programming interface 850 and module body is similar to that of database application programming interfaces commonly found in the industry. One distinguishing feature is that the Smart Card Database Module 850 utilizes the Smart Card Access Module described below to provide information storage with access protection.

Smart Card Access Module

This module 860 has three responsibilities: (1) provide security above and beyond that already supplied by the smart card; (2) provide an interface to the smart card having the functions open, close, seek, read, write, and ioctl; and (3) control writes to disk files so that only the smart card which was used to create the file can access the file. The disk essentially becomes an extension of the smart card. This feature provides a means to back up smart cards onto disk media in a secure manner, however, it is certainly not limited to this usage.

Smart Card Operations (SMOPS)

This module 870 provides one C language function pointer for each command in a predefined-smart card command set. It is responsible for manipulating the C function arguments to create a packet of data which is issued to the Card Reader Operations layer to be submitted to the smart card. The module is designed in such a way as to be smart card independent. For example, the function which turns the smart card on turns on any ISO compliant smart card (for example, Microcard and GemPlus smart cards). Other functions include commands to read the smart card, create files on the smart card, submit access codes to the smart card, et cetera.

The preferred embodiment supports four types of smart cards: GemPlus COS, GemPlus MCOS, Microcard TB-100, and Microcard TB-1000. However other smart cards could be incorporated without departing from the present invention.

This module 870 makes the idiosyncrasies of particular smart cards transparent to the user. There are many suitable ways to design this module without departing from the present invention. One way is through the use of C++ virtual functions. A second way is through the use of a function callout table. Generally speaking, there is a sub-module 872 for each supported smart card which performs instructions to provide the behavior of the predefined command set. The specific code incorporated into the module depends 870 on the chosen smart card(s).

Card Reader Operations (CROPS)

This module 880 is responsible for taking data packets from the SMOPS layer 870, appending headers and trailers according to the smart card reader's specifications, and then issuing the command to the smart card via the COM, PCMCIA, or other interface. The interface to the layer above is independent of the smart card reader (e.g. the same functions are used regardless of type of smart card reader attached to the system).

In one embodiment, three types of smart card readers are supported: the GemPlus GCR 200, the GemPlus GPR 400, and the Microcard TLP line. Other smart card readers may be added or substituted without departing from the present invention.

This module 880 has a predefined command set which is incorporated using methods similar to those found in the SMOPS layer 870 whereby there is one sub-module 882 for each type of card reader. These sub-modules 882 are responsible for providing the pre-defined command set behavior.

COM (device layer) Module

This module 890 is responsible for handling the PC I/O mechanisms. In one embodiment, communication is provided via UART COM ports. In alternate embodiments, however, any type of input/output ports may be used without departing from the present invention.

Smart Card Description

One example of a smart card is a GemPlus smart card (COS or MCOS, 8k with DES products) which is compatible with ISO 7816 standards and/or 10536 or derivatives thereof. One skilled in the art will readily recognize that other brands of smart cards which conform to these standards and provide secure data storage functions may be substituted without departing from the present invention.

Detailed Description of the Smart Card Access Module

Within this section an "application" is defined to include any software which directly calls functions available in the Smart Card Access Module.

The Smart Card Access Module provides two distinct interfaces, the Security interface and the Logical File interface. The application or human user, collectively referred to as "the caller", may communicate to sub-modules either by way of the window interface (for the human caller), or through the exported C language library functions. Some sub-modules provide both a human interface and programming interface functions, but most provide either one or the other.

The sub-functions which make up the body of the module provide the caller with controlled access to data stored the smart card. The body of the module sends requests to the SMOPS module in order to communicate with the smart card (the SMOPS module is described in other parts of this document).

The Security Interface

The security interface provides controlled access to the smart card. It is responsible for retrieving questions and answers from the card, calculating and submitting access codes to the card, and calculating encryption keys which are supplied to the Logical File interface. These keys are used to encrypt the information stored within logical files on the smart card.

The interface includes window controls to present the questions to the user, retrieve the user's answers, and change the questions and answers. There is also a set of function calls to retrieve the questions from the smart card and to submit requests. This input is used to calculate and submit the access codes which are presented to the smart card and to calculate the encryption keys used by the Logical File interface.

One embodiment of the security interface incorporates one of two possible Access Hierarchies, Smart Card Access Hierarchy and Access Control Mechanisms, described below.

The Logical File Interface

The Logical File interface presents the application with a program library interface similar to the standard C interface used to access disk files which includes the function calls open, seek, write, read, close and ioctl. The functions provided by this interface behave identically to the C disk file interface counter-parts with the following exceptions:

The functions have a different name so as to be distinguished by the compiler and linker.

The "open" function call takes as arguments a DOS style, '\' delineated path name where the first segment indicates the COM port ("COM1", "COM2", etc.), the second segment is the security level ("1", "2", etc), and the third argument is a logical file number preceded by an '@' ("@1", "@2", etc). The second argument indicates the mode in with the file is to be opened. Options for the second argument include, but are not limited to "read-only", "read-write", and "create if not existent". The final segment of the path may include a full path to a conventional DOS disk file. In this case all input and output (I/O) would be to the disk file under the security of the Access Control module (any such disk files are accessible only by the smart card used to create the file).

All information written to the file is encrypted such that only the smart card which originally wrote to the file is capable of providing the key needed to decrypt the information. Note that this is distinct and separate from the functionality provided by the File Encryption/Decryption Module.

Prior to being granted access to the information stored in the specified "file" on the smart card, the user must be authenticated by the Security interface for the specified smart card and security compartment. If the user is not properly authenticated, any attempt to access information will be denied.

Smart Card Access Hierarchy

In one embodiment of the present invention, a sophisticated access hierarchy is incorporated to segregate users by their security clearance level. For example, an access hierarchy was described in U.S. Pat. No. 5,610,981 issued on Mar. 11, 1997, which is related to U.S. Pat. No. 5,327,497, issued Jul. 5, 1994.

A smart card (or "IC card") is used in conjunction with a card reader. The smart cards are compatible with ISO standards, which support the Data Encryption Standard (DES) data encryption and decryption functions. One skilled in the art will readily recognize that other cards which conform to this standard and provide data encryption and decryption functions may be substituted.

Figure 12:
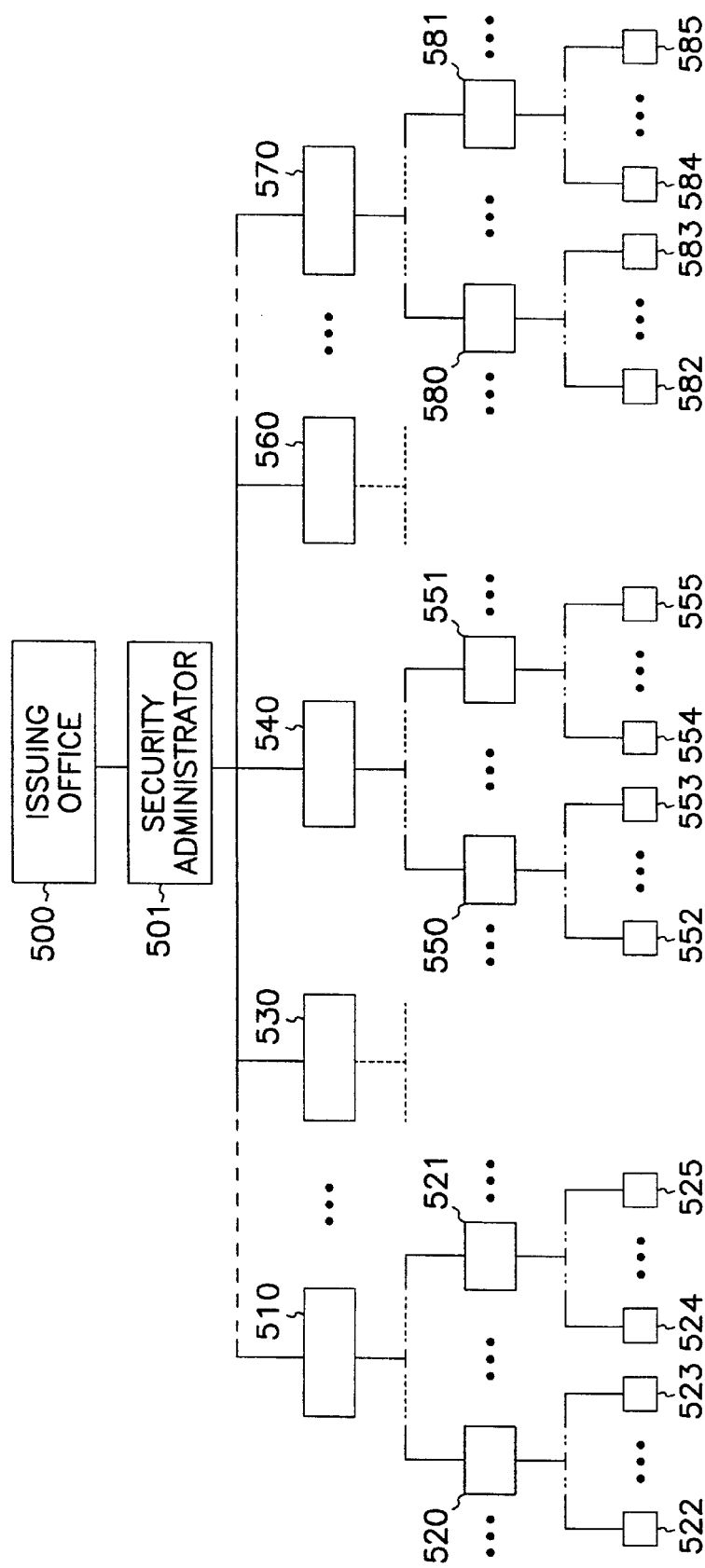
FIG. 12 shows one example of a smart card access hierarchy according to an alternate embodiment of the present invention.

FIG. 12 shows one embodiment of a hierarchy of secured access codes among a multiuser organization. The present invention teaches a hierarchy coding method used to generate families of access codes which permit horizontal and vertical segregation of access codes within an access hierarchy. As shown in FIG. 12, the access code is designed to allow a subordinate user's superior to access the subordinate's computer, but only if the superior has access in the same vertical portion of the user hierarchy. For example, referring to FIG. 12, user 520 cannot access the information on user 510's computer (520 is subordinate to 510), but can access the information on user 522's computer. However, user 520 has no access authority over user 550 (no horizontal access privilege), nor does user 520 have access authority over user 552 (lacking vertical commonality). A benefit of such organizations of key information is that access may be limited in an organized and restricted hierarchy. For example, if somehow security is compromised in the middle branch of FIG. 12, then the left and right branches are not compromised.

A vast array of users are therefore accommodated easily within the hierarchy shown in FIG. 12 by dedicating access code words to each level. In one such embodiment, sixty-four (64) bits are allocated to the access code word describing 510 level, allowing $2^{64}$ unique codes at 510 level; sixty-four (64) bits are allocated to the access code word describing level 520, allowing $2^{64}$ unique codes at the 520 level; and sixty-four (64) bits are allocated to the access code word describing level 522, allowing $2^{64}$ unique codes at the 522 level. These bits may be stored on card 160 in dedicated registers and assigned by the security administrator during the authorization visit.

The horizontal separation of users is easily attained by including an extra question in the list of queries posed and answered during the verification program execution. An answer could be predetermined which would be common among all users in a common vertical group, and which would segregate them from other users in other vertical groups. For example, each individual vertical group would be identified by a unique, predetermined response to the same question. The response could be mapped to a binary number, which could serve as a consistent offset for purposes of generating the access code. For example, if a question asked for a favorite sport, the response "golf" could be used by all members of a particular vertical group to identify themselves as a member of the particular group.

In one embodiment of the present invention, three questions are used to identify the user, and an extra question is used to identify the particular vertical branch of the access tree the user resides. These questions are employed to select the DES encryption keys available to the user. In this way, the DES encryption key questions serve as a further randomization of the access code which is user dependent.

Access information is essentially distributed between the user (in the preprogrammed responses generated by that user) and the card 160 (programmed when the individual is given access authority). This provides for a high level of security for the entire system.

Smart Card Access Hierarchy 2—Access Control Code Mechanisms

This hierarchy is a multiple-tier access control/crypto system comprising a series of security compartments. Security compartment 1, or level 1, is the least secure with more secure compartments following. Each security compartment is protected by an access code, and the data within the compartment is encrypted.

The access code for the base level is derived by combining user input with information known only by the application using a one-way hashing algorithm. Levels beyond the first level use a piece of information from the previous levels and a similar hashing algorithm. This dependency guarantees that the security compartments can only be accessed in ascending order (FIG. 9).

Figure 10:
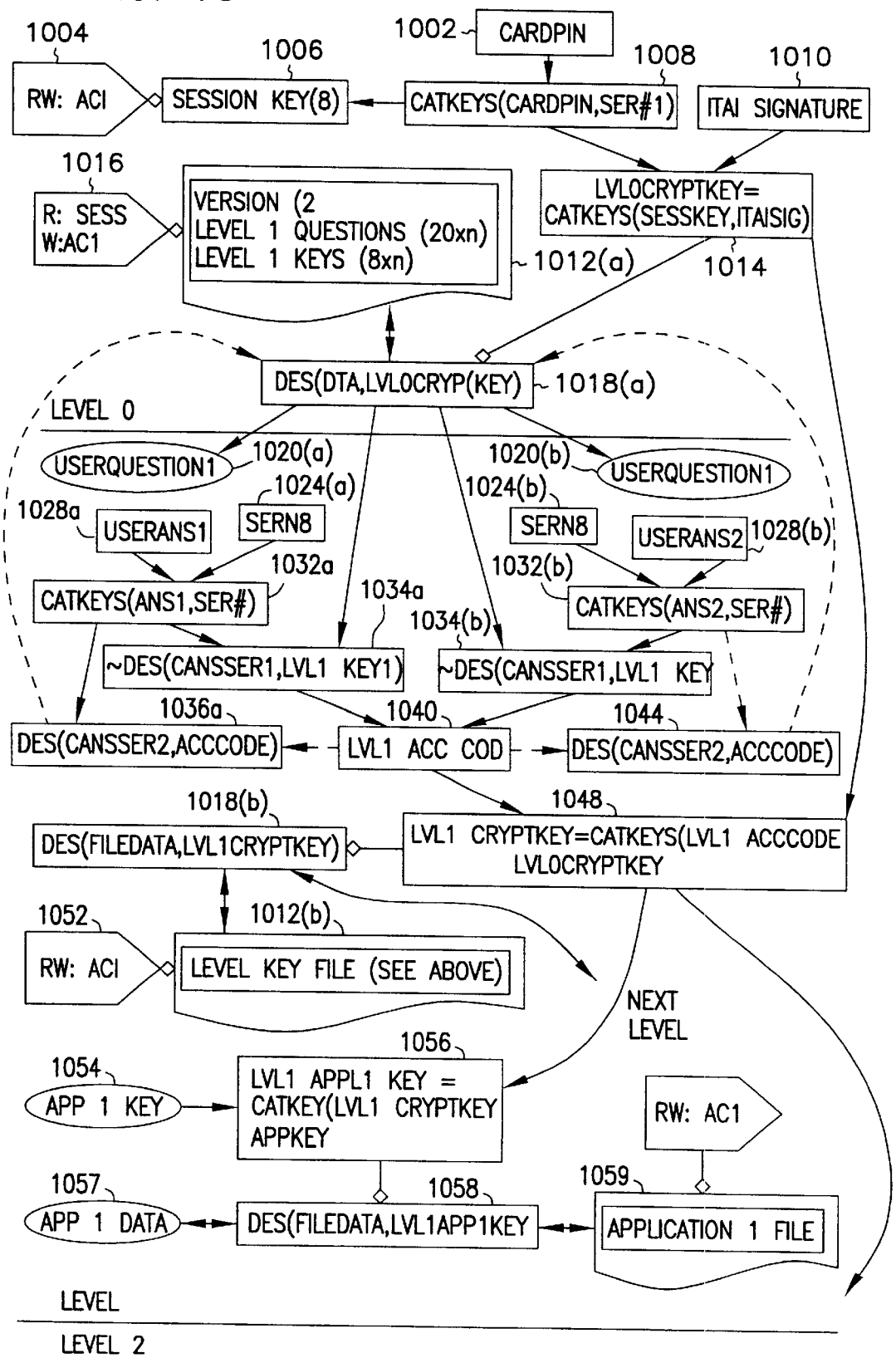
FIG. 10 is a block diagram of the access module in one embodiment of the present invention.

FIG. 10 shows the Security interface supplying a question back to the caller at the caller's request 1020a. A question corresponding to controlling access to the next security compartment is randomly chosen from a pool of questions that are only accessible in the current security compartment. In the example shown the caller supplies a digital answer 1028a to the question back to the Access Module.

The program library uses the caller's answer 1028a and the smart card's serial number 1024a to calculate the real smart card access code 1040. The real access code is unique to each smart card even when the answer supplied is identical.

The real smart card access code 1040 is combined with the crypt key generated at the previous level 1014 to produce the crypt key 1048 for the current level. This crypt key 1048 is used by (1) the Security Module to decrypt questions for the next level, (2) the next level to form its crypt key, and (3) form an "Application Key" 1058 which is provided to the Logical File system to encrypt the caller's data.

The mechanism just described prohibits one application from accessing data owned by a different application while still allowing both to share a the smart card's single access control/crypto system. Hackers cannot attack at the Access Interface since they would not know correct application code.

Each security level n, except the base security level (level 0), may be configured to have one or more Question/Answer pairs. Each answer is directly associated to a given question ($Q_n$) and a Level Key (Level$_n$ Key), both of which are stored together in the level n−1 security compartment 1012 (i.e. the question/answer/level key set for security compartment 1 are stored in compartment 0).

The following formulas are used to derive a unique access code from multiple question/answer pairs for levels one through five 1020–1040:

CansSer$_n$=Hash(Answer$_n$, Card Serial Number)

Level$_n$ Access Code=~DES(CAnsSer$_n$, Level$_n$Key)

Where Hash (referred to as "CatKeys" in FIG. 10), is an algorithm which takes two variable length byte strings and processes them through a hashing algorithm to produce a single byte string suitable for use as a key in a given encryption algorithm and as an access code which can be presented to the SMOPS layer/smart card.

This process allows multiple answers for a given level to condense to a single given access code for the smart card and single encryption key for the Logical File module.

All information stored on the smart card is encrypted using an encryption algorithm (i.e. DES). As illustrated in FIG. 10, each level has a encryption key 1048 unique to the current combination of smart card, user, and the security level. The key used to encrypt the level key file data is called the Level$_n$ Crypt Key. The Level$_O$ Crypt Key 1014 is derived as follows:

Session Key=CatKeys (Card Pin, Card Serial Number) 1008

Level$_O$ Crypt Key=CatKeys (Session Key, ITAI Signature) 1014

The remaining level encryption keys are derived as follows:

Level$_n$ Crypt Key=CatKeys (Level$_n$ Access Code, Level$_{n-1}$ Crypt Key) 1048

Application data at a given level 1057 is encrypted by a key calculated from the Level$_n$ Crypt Key along with a string supplied to the access module by the application 1054 as follows:

Level$_n$ App Key=CatKeys (Level$_n$CryptKey, Application Key) 1056

All data encryption in the access module is handled automatically and transparently by the access module. This process guarantees that the stored data on the smart card.

Ciphered Smart Card Sessions

Some smart cards allow information to be transferred to and from the card with a layer of encryption above and beyond any encryption already mentioned. Encrypted information occurs during a "session". A session is typically based on a known key and shared random number so that every "session" appears different even though they same command sequenced may have been exercised. This is intended to prevent an attacker from duplicating "sessions" or otherwise stealing data by analyzing the electronic signals which are sent to and from the smart card.

As shown in FIG. 10, Level zero is controlled by the smart card session key 1006. To begin a "session", the card pin 1002 supplied by the caller is concatenated with the serial number contained on the smart card 1008 using a one-way hashing algorithm to calculate the session key 1006. This session key is then submitted to the SMOPS layer who initiates a ciphered session as per specifications defined by the smart card manufacturer.

It is to be understood that the above description is intended to be illustrative, and not restrictive. Many other embodiments will be apparent to those skilled in the art upon reviewing the above description. The scope of the invention should, therefore, be determined with reference to the appended claims, along with the full scope of equivalents to which such claims are entitled.

What is claimed is:

1. An access control system including a screen and an input/output port, the access control system comprising:

a hard disk containing encrypted information;

a smart card reader connected to the input/output port;

a smart card containing electronic keys for access control to a computer; and the computer executing an access control program for communications with the smart card reader and the smart card, including card reader control means for controlling a plurality of smart card reader types and smart card control means for controlling a plurality of smart card types, and providing communications based on a particular smart card reader attached to the computer and based on a particular smart card inserted into the smart card reader;

wherein the access control program requests information from a user to provide access to the system and use of the encrypted information.

2. The access control system of claim 1, wherein the encrypted information comprises a plurality of electronic keys for encrypting files and decrypting files.

3. The access control system of claim 1, wherein the smart card is an ISO 7816-compliant smart card.

4. The access control system of claim 1, wherein the end user must answer questions, based on trusted security level assigned, to access the encrypted information.

5. The access control system of claim 2 wherein the encrypted information is encrypted according to a secret key encryption algorithm.

6. The access control system of claim 2 wherein the encrypted information is encrypted according to a public key encryption algorithm.

7. The access control system of claim 2 wherein the encrypted information is encrypted according to the FORTEZZA encryption standard.

8. The access control system of claim 2 wherein the files comprise data, facsimile, video, or other message types of files.

9. The access control system of claim 2, wherein the files are compressed.

10. The access control system of claim 2, wherein the data files are stored on the computer hard disk.

11. The access control system of claim 2, wherein the files are transferred over networks, internet, intranet, global trade point network, world wide web, or point to point.

12. The access control system of claim 2, wherein the files are archived to a removable medium.

13. An access control system including a screen and an input/output port, the access control system comprising:

a hard disk containing encrypted information;

a smart card reader connected to the input/output port;

a smart card containing electronic keys for access control to a computer;

the computer executing an access control program for communications with the smart card reader and the smart card, including card reader control means for controlling a plurality of smart card readers and smart card control means for controlling a plurality of smart cards, and providing communications based on a particular smart card reader attached to the computer and based on a particular smart card inserted into the smart card reader;

an electronic key module for managing electronic keys for encrypting and decrypting files, including creating and deleting electronic keys;

a smart card database for storing the electronic keys, the smart card database resident on a smart card;

a smart card access module for reading and writing electronic keys to and from the smart card database;

a smart card operations module for managing the input/output operations of the smart card;

a card reader operations module for managing the interaction of the smart card with the smart card reader;

a file selection module for selecting a file to be encrypted or decrypted;

a file encryption/decryption module for accepting the file and using one of the electronic keys to encrypt or decrypt the file according to input user specification;

a corn module for managing communications between the smart card reader and the computer; and a main control module for coordinating the operation access control system;

wherein the access control program requests information from a user to provide access to the system and use of the encrypted information.

14. The access control system of claim 13, wherein the file encryption/decryption module encrypts files such that they remain secure when transmitted.

15. The access control system of claim 13, wherein the card reader operations module is capable of controlling smart card readers from any one of a variety of vendors, and wherein the smart card operations module is capable of controlling smart cards from any one of a variety of vendors.

16. The access control system of claim 1, wherein the computer executes an access control program which uses a C programming language file input/output paradigm to read information from the smart card and write information to the smart card, and wherein the access control program controls access to the information on the smart card, and wherein the access control program encrypts and decrypts files using the information on the smart card.

17. A method for protecting a first file on a computer, the computer comprising a keyboard, a display, a hard disk containing encrypted information, and an input/output port, the method comprising the steps of:

attaching any of a plurality of smart card readers to the computer's input/output port;

controlling the attached smart card reader with a card reader operations module;

generating an electronic key using the computer;

securely storing the electronic key in any of a plurality of smart cards;

controlling the smart card with a smart card operations module;

encrypting the first file, wherein the step of encrypting comprises the steps of:
  inserting the smart card in the smart card reader;
  recursively entering access codes to access the electronic key;
  validating the access codes as each is entered;
  identifying the computer file; and
  encrypting the computer file using the electronic key.

* * * * *